United States Patent Office 3,180,950
Patented Apr. 27, 1965

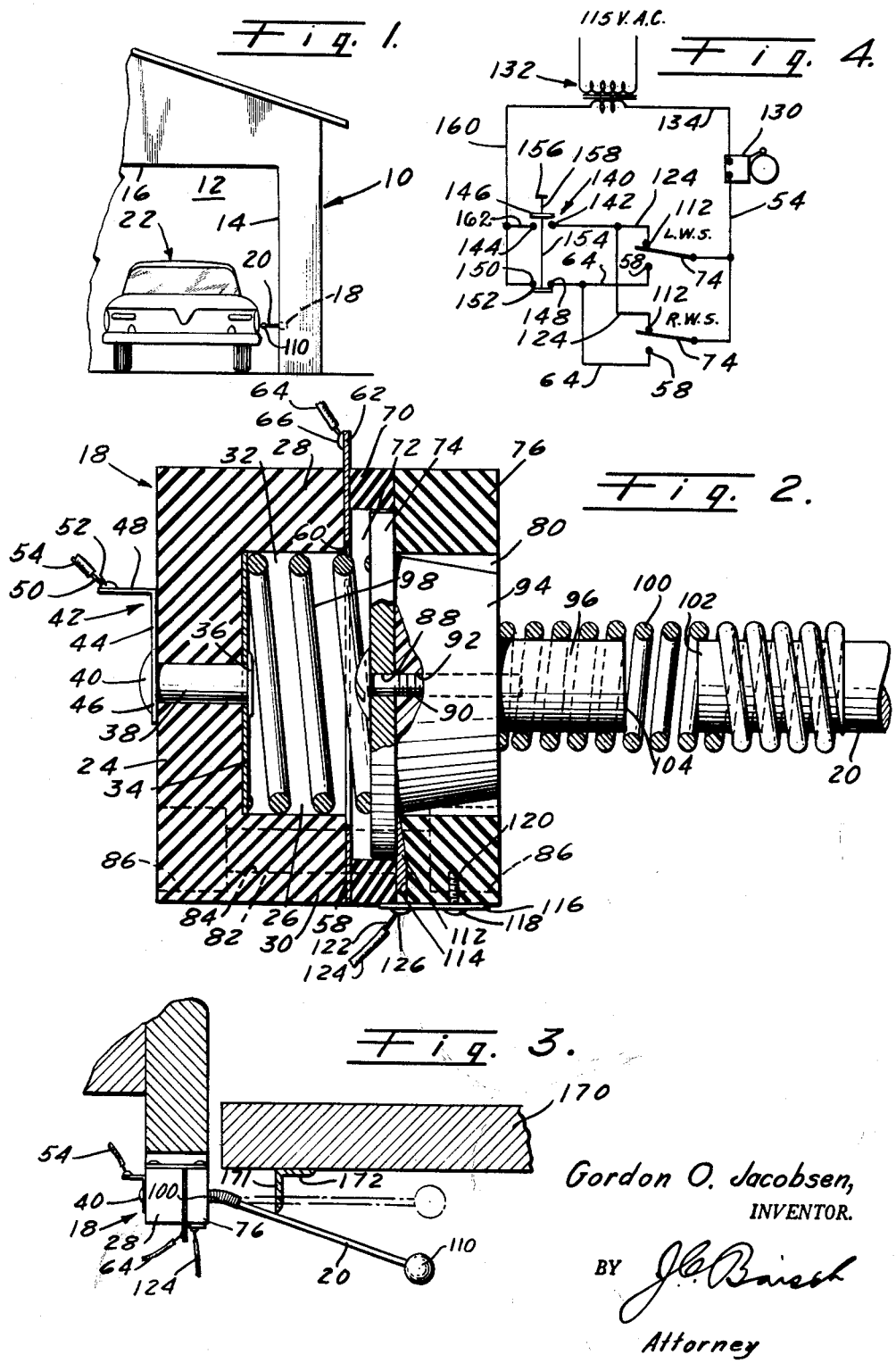

3,180,950
ELECTRICAL SWITCH FOR WARNING SYSTEMS
Gordon O. Jacobsen, 13935 E. 2nd, Whittier, Calif.
Filed Nov. 28, 1961, Ser. No. 155,337
9 Claims. (Cl. 200—61.41)

This invention relates generally to electrical systems and relates more particularly to electrical warning devices.

While the invention has particular utility embodied in an electrical warning or alarm arrangement adapted to be installed in garages or the like, and is shown and described therein, it is to be understood that its utility is not confined thereto.

As is well known, the driver of an automobile sometimes gets too close to the upright parts of the garage door frame when driving into the garage or out of it, with the result that the car strikes such part of the frame, scraping and/or denting the fenders and/or body of the car.

It is therefore an object of the present invention to provide a device or apparatus that will warn the driver of the automobile that the latter is too close to the adjacent upright part of the door frame so that said driver may stop the car before damage is done thereto or to the garage or both automobile and garage.

It is another object of the invention to provide a device or apparatus of this character that is adapted to be attached to the upright part or parts of a garage door frame and so positioned that should the automobile approach too close thereto audible warning will be given in time for the driver to stop the car before the damage is done thereto or to the garage.

Still another object of the invention is to provide a device or apparatus of this character that has a yielding feeler engageable by the automobile for setting off the warning when said automobile gets too close to the door frame.

A further object of the invention is to provide a device or apparatus of this character that will not damage the automobile when the latter approaches so close to the door frame as to set off the warning signal.

It is a still further object of the invention to provide a device or apparatus of this character which, when thus installed, is so related to the garage door that it will sound an alarm when the door is opened by unauthorized persons such as burglars or the like.

Another object of the invention is to provide a device or apparatus of this character which may be operably installed at either side of the garage door frame.

Still another object of the invention is to provide a device or apparatus of this character that may be easily and quickly set for operation either as such a warning device or as such an alarm.

A still further object of the invention is to provide a device or apparatus of this character that may be used in other environments to give a warning when a moving object approaches too close to an obstruction or the like such as would damage the moving object or the obstruction.

It is another object of the invention to provide a device or apparatus of this character that is simple in construction.

Still another object of the invention is to provide a device or apparatus of this character that is effective and reliable in operation.

A further object of the invention is to provide a device or apparatus of this character that is compact and occupies very little space so that it will not be in the way when installed.

A still further object of the invention is to provide a device or apparatus of this character that is relatively inexpensive to manufacture.

Referring more particularly to the drawings, which are for illustrative purposes only:

FIG. 1 is a front view of one side of a garage with a device or apparatus embodying the present invention operably attached to the upright side of the garage door frame and an automobile in the opening defined by said door frame and adjacent said device or apparatus;

FIG. 2 is an enlarged view, partly in section, of the switch mechanism of the present invention;

FIG. 3 is a view of the device or apparatus operabl associated with the garage door of the overhead type, the door being in a partly closed position whereat the switch of the device has been opened by the door; and FIG. 4 is an electrical diagram of the electrical system of the device or apparatus or system.

Referring more particularly to FIG. 1, there is shown a garage, indicated generally at 10, having a door frame defining a door opening 12, said frame including vertical or upright side members 14 and a horizontal top member 16. The warning and alarm device is shown attached to the upright side member of the door frame, said device being indicated generally at 18. When positioned as shown in FIG. 1 the switch actuating member 20 extends horizontally inwardly of the frame member 14 at the proper height to be moved horizontally by the body of an automobile, indicated generally at 22, should the automobile come too close to the side frame member 14 as said automobile is being driven into or out of the garage.

Referring to FIG. 2 the present device or apparatus comprises a square housing including a body of any suitable insulating material such as "Bakelite" or other suitable plastic material. The body includes an end wall 24, side walls 26, a top wall 28 and a bottom wall 30, said walls defining a recess 32.

In the bottom or closed end of the recess is a metal disc 34 disposed against the inner side of the end wall 24 and secured in position by the head 36 of a rivet 38 received in an opening provided therefor in said disc, the outer end of said rivet being overturned as at 40 to thereby retain said rivet in position.

An end connector, indicated generally at 42, has a part 44 with an opening 46 therein receiving the outer end of the rivet 38 so that the portion of said end connector part 44 about the opening 46 is beneath the overturned part 40 of the rivet and securely held thereby. End connector 42 is provided with an outwardly turned end portion 48 to which a wire 50 is soldered, as at 52. Wire 50 may, of course, be otherwise secured to the outwardly turned portion 48. It is to be noted that the wire 50 is provided with suitable insulation 54.

At the end of the housing body opposite wall 24 there is a flat contact member 58 disposed on the free edges of the walls 26, 28 and 30. Member 58 should not extend outwardly beyond the plane of the walls 26, 28 and 30, and said member has an opening 60 therein larger than the adjacent end of the recess 32. There is a tab 62 which is integral with said member 58 and which extends outwardly for attachment of the bare end of a wire 64 by means of solder 66 or other suitable means.

A spacer 70 of insulating material is disposed against the contact member 58, said spacer having an outer configuration and size the same as that of the body. There is an annular opening through said spacer which is of substantially greater diameter than the diameter of the opening 60 of the contact member 58 to thereby provide an operating space or chamber 72 for an annular movable contact plate 74. The latter is of slightly smaller diameter than the diameter of recess 72 so that said contact plate may have tilting movement as will be described more particularly hereinafter.

Contact plate 74 is operably retained in the space or chamber 72 by means of a retainer 76 of insulating material, said retainer having the same outsize configuration and size as the spacer 70. Retainer 76 has an annular or cylindrical opening 80 therethrough which is of substantially smaller diameter than the diameter of the contact plate 74.

It is to be noted that the assembly of the body, fixed contact member 58, spacer 70 and retainer 76 are secured together by means of a plurality of suitable screws 82 in bores 84 and counter bores 86 provided therefor, only one such screw with its bore and counter bores being shown.

Contact plate 74 has an axial opening 88 therethrough for reception of a screw 90 which is threadably received in a tapped bore 92 in a tiltable, frusto-conical base member 94 of insulating material which is operably received in the opening 80 of the retainer 76. Base 94 has its smaller end at the outer end of the opening 80 and there is a cylindrical projection 96 which is integral with and which extends outwardly from the small end of the base member 94 in axial alignment therewith, said projection being of smaller diameter than the adjacent end of the base member 94.

A spring 98 is disposed in the recess 32 with its inner end contacting the contact disc 34, the other end of said spring extending through the opening 60 in the contact 58, into the chamber 72 and against the adjacent side of the movable contact plate 74 to urge same outwardly so that a substantial marginal portion of the other side of the plate 74 is yieldingly held against the inner portion of the retainer 76, this being the normal position of said plate 74. Spring 98, being of metal, provides an electrical connection between the disc 34 and the metal contact plate 74 and normally maintains said plate 74 spaced from the fixed contact member 58, it being noted that the plate 74 has a thickness substantially less than the depth of the chamber 32.

There is flexible switch actuating means, comprising the actuating member or rod 20 which has one end flexibly connected to the projection or extension 96 by means of a coil spring 100, it being noted that the inner end 102 of the rod 20 is spaced from the outer end 104 of the projection 96.

When actuating force is applied to the rod 20 the base 94 and movable contact plate 74 will be tilted against the force of spring 98 until an edge of plate 74 engages the fixed contact member 58. It is to be understood that spring 100 is of sufficient stiffness to cause the base 94 and movable contact plate 74 to tilt against the force of spring 98 when the actuator member or rod 20 is moved from its normal position whereat it is axially aligned with the opening 80. It will be noted that the frusto-conical shape of the base permits it to tilt within the opening 80. If, after the contact plate 74 has been tilted into engagement with the contact member 58, there is a continued application to the rod 20 of a sufficient force, the spring 100 will yield to permit the rod 20 to swing out of axial alignment with the projection 96. The spring 100 will provide a resilient pivot means for the rod 20 which will return said rod into axial alignment with the projection 96 when said force thereon has been relieved.

At its outer end, the rod 20 is provided with a relatively soft bumper 110 which may be of rubber or other suitable material to absorb any blow or shock should said bumper be struck or engaged by an automobile or the like. This bumper also serves to prevent the finish of the automobile from scratches or damages should said automobile scrape against said bumper.

There is also another fixed metal contact, indicated at 112, which is received in a recess 114 provided therefor in the inner side of the retainer 76. Contact 112 is of limited annular extent relative to the chamber 72, being positioned at one side thereof. Contact 112 is secured to a plate 116 secured to the retainer 76 by means of a screw 118 received in an opening provided therefor in said plate and threadably received in a tapped bore 120 in said retainer 76. The bare end 122 of an insulated electric wire 124 is secured to said plate 116 by solder 126 or other suitable means.

Referring to FIG. 4, there is shown a complete system wherein there are two warning switches, a Left Warning Switch, L. W. S., for one side of the garage door frame, and a Right Warning Switch, R. W. S., for the other side of the garage door frame. These warning switches are of the same construction as that shown in FIG. 2 and in the diagram of FIG. 4 the parts shown in the other figures are given the same reference numerals. Further, a description of the L. W. S. only will be given since the operation of R. W. S. will be the same.

The wire 54, which in FIG. 2 is shown as being connected to the movable contact plate 74 by means of the connector 42, rivet 38 and spring 98, is shown in FIG. 4 as connected to the plate 74. The other end of wire 54 is connected to one terminal of a bell 130 which in turn has its other terminal connected to a source of current 132 by means of a wire 134. While the sounding device 130 is shown as a bell it may, of course, be any other suitable device for giving a warning sound such as, for example, a buzzer.

The source of power 132 is shown as being a transformer connected with a 115 volt A.C. commercial circuit. However, it is to be understood that any other suitable source of current may be used such as batteries. The circuit of the present system is, of course, of relatively low voltage, six or twelve volts, for example, being sufficient.

There is a double switch, indicated generally at 140, which is manually operable and includes a pair of fixed contact members 142 and 144 respectively and a movable contact member 146. There is also a second pair of fixed contact members 148 and 150 and a movable contact member 152. The movable contact members 146 and 152 are connected together by a member 154 and there is also an actuating knob 156 connected to the contact 146 by part 158. Thus actuation of the knob 156 effects simultaneous actuation of the movable contact members 146 and 152.

Wires 64 are connected to the fixed contact member 148 of the lower part of switch 140 and the other fixed contact member 150 is connected to the source of current by means of a wire 160. Wires 124 are connected to the fixed contact 142 of the upper part of switch 140, and fixed contact member 144 of said switch part is connected to the source of power by means of a wire 162 which is connected with the wire 160.

When the movable contact members 146 and 152 of the switch 140 are in the raised position, as shown in FIG. 4, the lower switch is closed, movable contact member 152 being in engagement with the fixed contacts 148 and 150.

The upper switch part will, of course, be open and the switch device 18 will also be open since the movable contact 74 is out of engagement with the fixed contact 58. Hence, no current flow to the alarm device or bell 130. However, should the rod 20 be actuated to tilt the contact member 74 into engagement with the contact 58, as by the automobile 22 being driven too close to the door frame member 14, the bell 130 will be energized to warn the driver who can stop before damage is done to either the automobile or the garage, and maneuver the automobile away from the frame member 14 and into the garage at a safe distance from said member 14.

It is to be noted that the rod 20 is moved horizontally but that since the contact member 58 is annular that tilting of the contact member 74 in any direction will effect closing of the circuit between said contact members 74 and 58.

When it is desired to set the switch mechanism 18 as an alarm, the garage door 170, which is of the overhead type, is pulled outwardly and downwardly to the closed position. There is an angle iron or bracket 171 secured vertically to the inner side of the door by screws 172, said angle member being adjacent the vertical edge of the door and in a position to engage the rod 20 and move same horizontally inwardly, as best shown in FIG. 3. This causes the contact member 74 to tilt in the clockwise direction, as viewed in FIG. 2, so as to disengage the fixed contact member 112. Since the contact member 112 is at one side only there is an open circuit between switch members 74 and 112. It will be noted that the member 74 fulcrums on its upper edge and against only the inner surface of the retainer 76 which is of insulating material.

Switch 140 is then moved to the lower position whereat the lower switch part will be open and the upper switch part will be closed by engagement of the movable contact member 146 with the fixed contact members 142 and 144. Since no current can pass from the movable contact member 74 to the contact member 112 the bell will not be energized. Should the door now be opened the pressure on the bar 20 by the angle member will be relieved so that the plate or member 74 will be moved by spring 98 to the position shown in FIG. 2 and will then engage contact member 112 whereupon the bell 130 will be energized. Should the door be opened by an intruder, there will thus be given an adequate warning of the presence of such intruder.

While the door 170 is shown as being of the overhead type, it is to be understood that it may be of any other suitable type which would actuate the rod 20.

I claim:

1. An electrical control device, comprising: a housing of insulating material; a fixed contact member at one end of said housing; insulating means defining a chamber at the side of said fixed contact member opposite the housing, said means including a retainer of insulating material having an opening therethrough; a movable contact member operably mounted in said chamber; spring means yieldingly urging said movable contact member normally against said retainer out of contact with said fixed contact member; and actuating means having a part extending through the opening in said retainer, the outer end of said part being of smaller diameter than said opening so as to be tiltable therein, said movable contact member being secured to the inner end of said part and tilted thereby in said chamber when said part is tilted.

2. The invention defined by claim 1 wherein said actuating means includes outwardly extending means secured to said part, an outer portion of the outwardly extending means being movable from an aligned position with respect to the movable contact member.

3. The invention defined by claim 1 wherein said actuating means includes an outwardly extending rod in axial alignment with said movable contact member; and means resiliently connecting said rod and said part.

4. The invention defined by claim 3 wherein there is a protective element secured to the outer free end of said rod.

5. The invention defined by claim 1 wherein the opening in the retainer is annular and of relatively large size, said part of said actuating means comprises a frustoconical base tiltably disposed in said opening, said movable contact member being secured to the inner end of said base; an elongated member extending axially outwardly relative to said base; and a spring yieldingly connecting said elongated member to said base.

6. The invention defined by claim 5 including a protective bumper on the free end of said elongated member.

7. The invention defined by claim 5 wherein the housing has an annular recess therein open at the end having the first mentioned fixed contact member, the latter having an opening therethrough of somewhat larger size than the adjacent open end of said recess; said movable contact member being yieldingly held in its normal position by a spring; said spring being disposed in said recess and extending through the opening in the fixed contact member and into engagement with the movable contact member for yieldingly holding said movable contact member in its normal position; and a plate of electrical conducting material secured in the bottom of the recess and engaged by said spring, said plate being connectable into an electric circuit.

8. The invention defined by claim 1 including a second fixed contact member mounted at one side of said chamber and normally in contact with a limited portion of said movable contact member, the latter being tiltable away from said second fixed contact member to break the electrical connection therewith.

9. An electrical control device, comprising a supporting structure; a first fixed insulated contact member carried by said supporting structure; a second insulated fixed contact member of limited effective extent supported by said supporting structure and spaced from the first fixed contact member; a movable contact member; means for mounting said movable contact for movement between said fixed contact member and normally out of contact with the first fixed contact member; yielding means for normally retaining said movable contact member in contact with the second fixed contact member and out of contact with the first fixed contact member; means for tiltingly mounting said movable contact member for tilting movement in various directions for engagement with said first fixed contact member and out of contact with said second fixed contact member; and actuating means for actuating said movable contact member upon lateral movement of said actuating means.

References Cited by the Examiner
UNITED STATES PATENTS

| | | | |
|---|---|---|---|
| 2,508,149 | 5/50 | Eliasson | 340—61 X |
| 2,658,967 | 11/53 | Matschke | 200—61.41 |
| 2,902,671 | 9/59 | Pitt | 340—61 |
| 2,980,783 | 4/61 | Handschin | 340—61 X |

ROBERT K. SCHAEFER, Acting Primary Examiner.

BENNETT G. MILLER, NEIL C. READ, BERNARD A. GILHEANY, Examiners.